(12) United States Patent
Bleckmann et al.

(10) Patent No.: US 11,781,466 B2
(45) Date of Patent: Oct. 10, 2023

(54) EXHAUST SYSTEM FOR AN INTERNAL COMBUSTION ENGINE OF A MOTOR VEHICLE, DRIVE DEVICE FOR A MOTOR VEHICLE AND MOTOR VEHICLE

(71) Applicant: Daimler Truck AG, Leinfelden-Echterdingen (DE)

(72) Inventors: Johannes Bleckmann, Friedrichshafen (DE); Alexander Massner, Esslingen (DE); Michael Stiller, Remseck (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/642,642

(22) PCT Filed: Aug. 13, 2020

(86) PCT No.: PCT/EP2020/072691
§ 371 (c)(1),
(2) Date: Mar. 11, 2022

(87) PCT Pub. No.: WO2021/047853
PCT Pub. Date: Mar. 18, 2021

(65) Prior Publication Data
US 2022/0381174 A1  Dec. 1, 2022

(30) Foreign Application Priority Data

Sep. 13, 2019  (DE) ..................... 10 2019 006 494.1

(51) Int. Cl.
*F01N 13/00* (2010.01)
*F01N 3/025* (2006.01)
(Continued)

(52) U.S. Cl.
CPC ........... *F01N 13/009* (2014.06); *F01N 3/025* (2013.01); *F01N 3/035* (2013.01); *F01N 3/2033* (2013.01);
(Continued)

(58) Field of Classification Search
CPC .......... F01N 3/021; F01N 3/023; F01N 3/025; F01N 3/0253; F01N 3/0256;
(Continued)

(56) References Cited

U.S. PATENT DOCUMENTS 3,690,840 A  9/1972  Volker
5,771,683 A  6/1998  Webb
(Continued)

FOREIGN PATENT DOCUMENTS

DE         195 08 804 A1   9/1996
DE   10 2008 032 604 A1   1/2010
(Continued)

OTHER PUBLICATIONS

PCT/EP2020/072691, International Search Report dated Nov. 27, 2020 (Four (4) pages).

*Primary Examiner* — Binh Q Tran
(74) *Attorney, Agent, or Firm* — Crowell & Moring LLP

(57) ABSTRACT

An exhaust system of an internal combustion engine of a motor vehicle includes a particulate filter where particles are filterable out from the exhaust gas by the particulate filter. A selective catalytic reduction (SCR) catalytic converter through which the exhaust gas from the internal combustion engine is flowable for denitrifying the exhaust gas from the internal combustion engine is disposed downstream of the particulate filter. The exhaust gas of the internal combustion engine is heatable by a combustor at a point disposed upstream of the SCR catalytic converter and downstream of the particulate filter where the combustor provides an
(Continued)

exhaust gas of the combustor. Particles are filterable out from the exhaust gas of the combustor by a filter element.

10 Claims, 3 Drawing Sheets

(51) Int. Cl.
*F01N 3/035* (2006.01)
*F01N 3/20* (2006.01)
*F01N 3/023* (2006.01)
*F01N 9/00* (2006.01)

(52) U.S. Cl.
CPC ............ *F01N 3/2066* (2013.01); *F01N 3/023* (2013.01); *F01N 3/0231* (2013.01); *F01N 3/0256* (2013.01); *F01N 3/206* (2013.01); *F01N 9/002* (2013.01); *F01N 2240/14* (2013.01); *F01N 2570/14* (2013.01); *F01N 2610/02* (2013.01); *F01N 2610/03* (2013.01); *F01N 2900/04* (2013.01); *F01N 2900/1404* (2013.01)

(58) Field of Classification Search
CPC ...... F01N 3/2033; F01N 3/035; F01N 3/0821; F01N 3/0842; F01N 3/029; F01N 3/0293; F01N 3/0814; F01N 3/0871; F01N 3/0885; F01N 3/105; F01N 3/106; F01N 3/108; F01N 3/206; F01N 3/2066; F01N 3/2073; F01N 3/208; F01N 9/002; F01N 3/2885; F01N 13/009; F01N 2240/12; F01N 2240/14; F01N 2250/04; F01N 2250/06; F01N 2250/12; F01N 2570/14; F01N 2570/18; F01N 2610/00; F01N 2610/01; F01N 2610/02; F01N 2610/03; F01N 2610/04; F01N 2610/05; F01N 2610/06; F01N 2610/102; F01N 2610/1453; F01N 2900/04; F01N 2900/0404; F01N 2900/14; F01N 2900/1402; F01N 2900/1404; F01N 2900/1406; F01N 2900/18; F01N 2900/1806; F02D 41/027; F02D 41/029; F02D 2200/0812; Y02A 50/20; Y02T 10/12; B01D 46/00; B01D 46/0057; B01D 46/0058; B01D 46/006; B01D 46/0061; B01D 46/0063

See application file for complete search history.

(56) References Cited

U.S. PATENT DOCUMENTS

| | | | |
|---|---|---|---|
| 8,516,802 B2* | 8/2013 | Kotrba | F01N 3/032 |
| | | | 60/303 |
| 9,334,781 B2* | 5/2016 | Stanavich | F01N 13/009 |
| 11,193,411 B2* | 12/2021 | Paukner | F01N 3/101 |
| 11,506,136 B1* | 11/2022 | Harris | F01N 9/00 |
| 2008/0163612 A1* | 7/2008 | Gaiser | F01N 3/2033 |
| | | | 60/299 |
| 2011/0023461 A1* | 2/2011 | Strots | B01F 25/45231 |
| | | | 60/301 |
| 2011/0146254 A1* | 6/2011 | Yi | B01F 25/4316 |
| | | | 60/324 |
| 2015/0082777 A1* | 3/2015 | Tsumagari | F01N 3/0256 |
| | | | 60/311 |
| 2016/0017780 A1* | 1/2016 | Kinugawa | F01N 3/021 |
| | | | 60/286 |
| 2016/0208667 A1* | 7/2016 | Ge | B01D 53/9477 |

FOREIGN PATENT DOCUMENTS

| | | |
|---|---|---|
| DE | 10 2008 059 078 A1 | 5/2010 |
| DE | 10 2009 058 379 A1 | 7/2011 |
| EP | 1 672 194 A1 | 6/2006 |
| EP | 1 728 984 A2 | 12/2006 |
| EP | 2 119 881 A2 | 11/2009 |
| EP | 2 192 279 A2 | 6/2010 |
| GB | 1026205 A | 4/1966 |
| WO | WO 2012/084156 A1 | 6/2012 |
| WO | WO 2018/219476 A1 | 12/2018 |

* cited by examiner

EXHAUST SYSTEM FOR AN INTERNAL COMBUSTION ENGINE OF A MOTOR VEHICLE, DRIVE DEVICE FOR A MOTOR VEHICLE AND MOTOR VEHICLE

BACKGROUND AND SUMMARY OF THE INVENTION

The invention relates to an exhaust system for an internal combustion engine of a motor vehicle. Furthermore, the invention relates to a drive device for a motor vehicle and a motor vehicle.

DE 10 2008 059 078 A1 discloses an exhaust gas aftertreatment system for, in particular, a self-igniting combustion engine, having a Denox catalyst inserted in an exhaust pipe, a particulate filter and an introduction device for a reducing agent. Here, a combustor, the particulate filter, the introduction device and the Denox catalyst are arranged in this order in the exhaust pipe.

Furthermore, a method for adjusting a state of an exhaust gas flow guided in an exhaust tract of an internal combustion engine of a motor vehicle is known from DE 10 2008 032 604 A1. A compressed air source is provided for generating a mass air flow guided in a fresh air line for supplying the internal combustion engine with combustion air.

The object of the present invention is to provide an exhaust system, a drive device and a motor vehicle, such that particularly low-emission operation can be achieved.

A first aspect of the invention relates to an exhaust system, also referred to as an exhaust tract, for an internal combustion engine, preferably in the form of a reciprocating engine, of a motor vehicle, in particular a motor car. This means that the motor vehicle in its completely manufactured state has the internal combustion engine and the exhaust system and can be driven by means of the internal combustion engine. Exhaust gas from the internal combustion engine can flow through the exhaust system. The internal combustion engine provides the exhaust gas of the internal combustion engine during a fired operation of the internal combustion engine. During the fired operation, combustion processes take place in the internal combustion engine. The internal combustion engine is designed, for example, as a spark-ignition internal combustion engine and thus as a petrol engine or as a self-igniting internal combustion engine and thus, for example, as a diesel engine. The exhaust system has a particulate filter through which the exhaust gas of the internal combustion engine can flow and which is designed, for example, as a diesel particulate filter (DPF), by means of which any particles, in particular soot particles, contained in the exhaust gas of the internal combustion engine can be filtered out of the exhaust gas of the internal combustion engine. This means that the exhaust gas of the internal combustion engine can be filtered by means of the particulate filter in such a way that any particles, in particular soot particles, contained in the exhaust gas can be collected and retained by means of the particulate filter and thus filtered out of the exhaust gas.

The exhaust system also has an SCR catalytic converter, through which the exhaust gas from the internal combustion engine can flow and which is arranged downstream of the particulate filter, for denitrification of the exhaust gas from the internal combustion engine. The SCR catalytic converter is catalytically effective for selective catalytic reduction (SCR). This means that the SCR catalytic converter is designed to catalytically effect and/or support the selective catalytic reduction (SCR). In the course of the selective catalytic reduction that takes place in the SCR catalytic converter, for example, nitrogen oxides (NOx) contained in the exhaust gas are converted to water ($H_2O$) and nitrogen ($N_2$). For this purpose, the nitrogen oxides contained in the exhaust gas react with ammonia ($NH_3$) to form water and nitrogen. The ammonia is provided, for example, by a reducing agent or comes from a reducing agent, wherein the reducing agent can be introduced, for example, into the exhaust system or into the exhaust gas flowing through the exhaust system. Denitrification of the exhaust gas means that any nitrogen oxides contained in the exhaust gas are at least partially removed from the exhaust gas by the SCR, whereby any nitrogen oxides contained in the exhaust gas are reduced, i.e., decreased.

In order to be able to implement a particularly low-emission operation of the internal combustion engine and thus of the motor vehicle as a whole, it is provided in accordance with the invention that the exhaust system has, in particular at least or exactly, one combustor by means of which the exhaust gas of the internal combustion engine can be heated at a point arranged upstream of the SCR catalytic converter and downstream of the particulate filter while providing an exhaust gas of the combustor. By way of example, the exhaust gas from the combustor is also referred to as combustor exhaust gas, wherein the exhaust gas from the internal combustion engine is also referred to as engine exhaust gas. By way of example, the combustor can provide the combustor exhaust gas by combusting a fuel-air mixture. By way of example, the combustor exhaust gas has a higher temperature than the engine exhaust gas and can mix with the engine exhaust gas, thereby heating the engine exhaust gas. By mixing the combustor exhaust gas with the engine exhaust gas, for example, a total exhaust gas comprising the combustor exhaust gas and the engine exhaust gas is produced, the temperature of which is greater than a temperature of the engine exhaust gas considered on its own. By heating the exhaust gas from the internal combustion engine, for example, at least one component of the exhaust system located downstream of the point can be heated effectively and efficiently. This component is, for example, at least the SCR catalytic converter, which can be heated effectively and efficiently by means of the combustor and can thus be brought, for example, particularly quickly to an advantageous temperature at or above which the SCR can run particularly advantageously in the SCR catalytic converter. In particular, the combustor can be used to bring the SCR catalytic converter to a sufficient or particularly advantageous high temperature after or during a cold start of the internal combustion engine in order to be able to ensure particularly low-emission operation. Since the point is upstream of the SCR catalytic converter and downstream of the particulate filter, the SCR catalytic converter can be heated effectively and efficiently by means of the combustor without, for example, the particulate filter being heated excessively by means of the combustor. At this point, for example, the combustor exhaust gas can mix with the engine exhaust gas. In particular, it is conceivable that the combustor exhaust gas provided by the combustor can be brought into or introduced into the engine exhaust gas at the point.

The feature that the engine exhaust gas can be heated by means of the combustor at the point arranged upstream of the SCR catalytic converter and downstream of the particulate filter is to be understood in particular to mean that the combustor is arranged upstream of the SCR catalytic converter and upstream of the particulate filter. In other words, the feature that the engine exhaust gas can be heated by means of the combustor at the point arranged upstream of the SCR catalytic converter and downstream of the particulate filter can alternatively also be expressed in such a way that the combustor is arranged upstream of the SCR catalytic converter and downstream of the particulate filter, in particular in the flow direction of the exhaust gas flowing through the exhaust system.

In order to be able to implement a particularly low-emission operation of the internal combustion engine, in particular with regard to particle emission, it is further provided according to the invention that the exhaust system has, in particular at least or exactly, one filter element, in particular provided in addition to the particulate filter and spaced apart from the particulate filter, for filtering out particles, in particular soot particles, from the exhaust gas of the combustor. In other words, the filter element is arranged and designed to filter out any particles, in particular soot particles, contained in the combustor exhaust gas. By way of example, the combustor exhaust gas can flow through the filter element and is designed to catch and retain particles, in particular soot particles, contained in the combustor exhaust gas. Since the combustor exhaust gas can have a substantially lower volume and/or mass flow than the engine exhaust gas, the installation space requirement, the weight and the costs of the filter element can be kept particularly low.

The aforementioned fuel-air mixture, also referred to simply as mixture, which is combusted by means of the combustor or in the combustor, is combusted, for example, in a combustion chamber of the combustor. In particular, the mixture is ignited and subsequently combusted, in particular by spark ignition and, for example, by means of a spark ignition device in the form of a spark plug. The combustor is supplied, for example, with a fuel, in particular a liquid or gaseous fuel, and with air, whereby, for example in the combustion chamber, the mixture of the air and the fuel is formed, with which the combustor is supplied. In other words, the mixture comprises the air and the fuel with which the combustor is supplied. Thus, for example, the combustor exhaust gas is formed in the combustion chamber, wherein the filter element can be flowed through, for example, by the combustion exhaust gas from the combustion chamber.

The invention is based in particular on the following findings: conventional combustors generate particles, in particular soot particles, and thus particle emissions, in particular soot particle emissions. Therefore, such combustors are usually installed upstream of particulate filters, in particular diesel particulate filters, by means of which particles are also filtered out of the exhaust gas of the internal combustion engine. However, since the combustor is assigned the filter element according to the invention, the combustor can be arranged or installed downstream of the particulate filter without causing excessive particulate emissions. By way of example, the particulate filter is arranged and designed to filter only the exhaust gas from the engine and the combustor and thus to filter only particles, in particular soot particles, from the exhaust gas from the combustor and the engine. Thus, for example, only the engine exhaust gas can flow through the particulate filter in relation to the engine exhaust gas and the combustion exhaust gas, but not also the combustor exhaust gas. Alternatively or additionally, it is preferably provided that the filter element assigned to the combustor can only be or only is flowed through by the combustor exhaust gas with respect to the engine exhaust gas and the combustor exhaust gas. Thus, for example, the filter element is arranged and designed to filter only the combustor exhaust gas in relation to the engine exhaust gas and the combustor exhaust gas, and thus to filter out particles, in particular soot particles, only from the combustor exhaust gas in relation to the engine exhaust gas and the combustor exhaust gas.

Furthermore, the use of at least one or more electrical heating devices, in particular heating catalytic converters, is conceivable, wherein such an electrical heating device could be positioned at least almost anywhere in the exhaust system. By means of such an electrical heating device, the engine exhaust gas can be heated using electrical energy, in particular electrical current, without thereby generating secondary emissions such as particulate emissions. The electrical heating device can, for example, provide heat using electrical energy and deliver it to or into the exhaust gas, in particular of the internal combustion engine. Compared to a combustor, by means of which the engine exhaust gas can be heated by burning a fuel-air mixture and thus providing combustor exhaust gas, only a very low heating capacity can be achieved by means of an electric heating device, particularly in a low-voltage range. An electric heating catalytic converter is about a factor of 12 lower in the heating capacity than a combustor at a voltage of 12 volts and about a factor of 3 to 4 lower at a voltage of 48 volts.

Thus, with the exhaust system according to the invention, it is possible to heat the engine exhaust gas and thus the SCR catalytic converter effectively and efficiently, in particular while avoiding excessive undesired heating of the particulate filter. Any particles contained in the combustor exhaust gas can be filtered out of the combustor exhaust gas by means of the filter element, which can be substantially smaller, lighter and less expensive than the particulate filter. Preferably, the filter element and the particulate filter are components that are formed separately from one another and are, for example, at least indirectly connected to one another and, in particular, spaced apart from one another. The filter element can be relatively small, since the combustor exhaust gas and particulate mass flow is small compared to the mass flow of the engine exhaust gas, and also an amount of ash contained in the combustor exhaust gas is very small, in particular compared to an amount of ash and oil contained in the engine exhaust gas.

In particular, the following advantages can be achieved by the invention:
- considerably lower cold-start emissions when using classic and proven exhaust gas aftertreatment concepts in order to be able to keep emissions, in particular nitrogen oxide emissions, particularly low
- reduction of nitrogen oxide emissions in critical applications and in actual driving operation (RDE—real driving emissions)
- decoupling of engine heating measures from a regulation or control system for regulating or controlling a temperature of the SCR catalytic converter, whereby emissions, in particular carbon dioxide emissions, can be kept particularly low
- desulphurisation, i.e., desulphurising of SCR catalytic converters which contain copper (Cu), for example
- compared to electrical heating catalytic converters or heating devices, a particularly high heating capacity can be implemented by means of the combustor independently of the voltage of an on-board electrical system of the motor vehicle, whereby a cold start time until the SCR catalytic converter reaches a temperature of more than 200 degrees Celsius can be greatly reduced or kept particularly low
- preventing deposits in a hydrolysis section, along which, for example, the reducing agent is subject to hydrolysis, in the course of which the reducing agent provides ammonia or ammonia is formed from the reducing agent.

By way of example, a urea solution, in particular an aqueous urea solution, is used as the reducing agent, which is subjected to hydrolysis along the hydrolysis section. In the course of the hydrolysis, ammonia ($NH_3$) is formed from the reducing agent, which can react with nitrogen oxide contained in the exhaust gas to form nitrogen and water in the course of the SCR.

Further findings underlying the invention are that sufficiently high exhaust gas temperatures are required for efficient exhaust gas purification. Especially in over-stochiometric applications, such as diesel engines, the exhaust gas temperatures are, due to lean operation, in the lower partial load, which can lead to a strong interaction between the internal combustion engine, also referred to as combustion engine or engine, and the exhaust system or an exhaust gas aftertreatment system to be effected by the exhaust system. Modern diesel engines have at least one or more exhaust gas turbochargers and/or combined charging systems (for example, electrical, mechanical) and at least one intercooler. Depending on the application, the turbine is designed as a fixed-geometry turbine, a wastegate turbine or a variable turbine. The wastegate turbine is also referred to as a blow-off turbine and usually comprises a bypass line, also referred to as a wastegate, via which a turbine wheel of the turbine can be bypassed by at least part of the exhaust gas of the internal combustion engine. For the purpose of reducing nitrogen oxide raw emissions, many modern engines have a cooled and, for example, regulated exhaust gas recirculation, which can comprise a high-pressure exhaust gas recirculation and/or a low-pressure exhaust gas recirculation or a combination of high-pressure exhaust gas recirculation and low-pressure exhaust gas recirculation.

The reducing agent required for nitrogen oxide reduction is, for example, metered into a mixing section upstream of the SCR catalytic converter, i.e., introduced into the exhaust gas. The preferably closed particulate filter collects particles or soot from the engine, whereby the exhaust gas counter-pressure can increase with increasing loading of the particulate filter. In order to avoid an excessively high exhaust gas counter-pressure, which can be or is caused by the loaded particulate filter, the particles collected in the particulate filter are either passively oxidised at approximately 300 to 450 degrees Celsius by nitrogen dioxide ($NO_2$) provided by the engine and an oxidation catalytic converter, which is optionally provided and, for example, arranged upstream of the particulate filter, in particular a diesel oxidation catalyst (DOC), or actively oxidised with oxygen at approximately 600 degrees Celsius, i.e., burned off and thus at least partially removed from the particulate filter. For this purpose, the oxidation catalyst upstream of the particulate filter, for example, is brought above its start-up temperature of approximately 220 degrees Celsius to 300 degrees Celsius, which is also referred to as the light-off temperature. The start-up temperature of the oxidation catalyst depends on its precious metal content, age, space velocity and/or input concentrations.

Additional fuel is then introduced into the exhaust gas, for example, such that uncombusted hydrocarbons (HC) are contained in the exhaust gas, for example upstream of the oxidation catalytic converter. The uncombusted hydrocarbons contained in the exhaust gas are combusted in the oxidation catalytic converter, wherein the combustion of the uncombusted hydrocarbons is catalytically supported or effected by the oxidation catalytic converter. Thus, for example, the oxidation is used as a catalytic combustor to increase the temperature of the engine exhaust gas.

In this way, for example, a temperature of approximately 550 degrees Celsius to 600 degrees Celsius is set or adjusted for a particulate filter, whereby particles contained in the particulate filter are oxidised with oxygen and thus burned off or combusted. For the rest of the time, a sufficiently high temperature of the SCR catalytic converter is aimed for in order to at least partially remove the nitrogen oxides contained in the exhaust gas from the exhaust gas in the course of the SCR.

The minimum release temperature for the reducing agent is usually around 180 degrees Celsius. In other words, for example, the reducing agent is usually introduced into the exhaust gas, in particular injected, only when the exhaust gas has a temperature of at least 180 degrees Celsius or more. However, in order to implement a high efficiency of the SCR, higher temperatures of, for example, 200 degrees Celsius to 220 degrees Celsius are also advantageous.

In connection with the regeneration of the particulate filter, different ways of thermal management have been established, for example by reducing the combustion air ratio, which is also referred to as combustion lambda, through engagement in an air management system. By means of current technologies, such as a throttle valve, exhaust flap and/or exhaust phase adjustment in conjunction with late injection timing, an effective temperature increase for a particulate filter generation can be achieved. The regeneration of the particulate filter has a duration of approximately 30 to 40 minutes, for example, wherein this duration is also referred to as regeneration duration. The regeneration duration is relatively short compared to normal operation, in which, for example, regeneration of the particulate filter does not take place and wherein the normal operation lasts, for example, several hours, such that additional fuel consumption to effect regeneration of the particulate filter plays a subordinate role.

However, if the same technologies are now used to regulate the temperature of the SCR catalytic converter for normal operation, then the additional fuel consumption plays a decisive role. In addition, cold-start emissions are increasingly becoming a focus of the requirements. A fuel-efficient temperature measure or temperature-increasing measure with rapid heating of the SCR catalytic converter is desirable. This can be implemented by the exhaust system according to the invention.

In order to be able to implement a particularly low-emission operation, it is provided in a further embodiment of the invention that the exhaust system has a pipe element through which the exhaust gas of the internal combustion engine can flow. In this case, the combustor has the aforementioned combustion chamber, which is arranged outside the pipe element. The combustion chamber is fluidically connected to the pipe element, for example, such that the combustor exhaust gas produced in the combustion chamber can flow from the combustion chamber into the pipe element. In the combustion chamber, the previously known fuel-air mixture can be ignited and combusted with the formation of the exhaust gas from the combustor. The combustor exhaust gas can be introduced from the combustion chamber into the pipe element at this point. The filter element is arranged downstream of the combustion chamber and upstream of the point, in particular in the direction of flow of the combustor exhaust gas flowing out of the combustion chamber and into the pipe element, and the combustor exhaust gas can flow through it.

It has also proved particularly advantageous if the exhaust system downstream of the SCR catalytic converter is free of a further filter for filtering the respective exhaust gas, in particular the total exhaust gas. This makes it possible to keep emissions particularly low in a manner that is particularly economical in terms of cost, weight and installation space.

A further embodiment is characterised in that the exhaust system comprises the oxidation catalyst mentioned above and designed, for example, as a diesel oxidation catalyst. The oxidation catalyst is preferably arranged upstream of the particulate filter and through which the engine exhaust gas can flow. Alternatively or additionally, the exhaust system has a nitrogen oxide storage catalyst through which the exhaust gas from the internal combustion engine can flow and which can be arranged upstream of the particulate filter. This can ensure particularly low-emission operation.

In a particularly advantageous embodiment of the invention, the exhaust system comprises a metering element, by means of which the reducing agent for denitrification of the exhaust gas of the internal combustion engine can be introduced, in particular injected, into the engine exhaust gas, at an introduction point arranged downstream of the point and upstream of the SCR catalytic converter. The reducing agent is preferably a fluid, preferably a liquid, that is provided in addition to the fuel of the combustor and is different from the fuel. By using the metering element and the reducing agent, emissions, in particular nitrogen oxide emissions, can be kept particularly low.

In order to be able to implement particularly low-emission operation, in a further design of the invention it is provided that the particulate filter is designed as a coated particulate filter and thus has a coating that is catalytically effective for selective catalytic reduction (SCR) for denitrification of the exhaust gas.

In a further design of the invention, the exhaust system has an ammonia slip catalyst (ASC) arranged downstream of the SCR catalytic converter and through which the engine exhaust gas can flow. This enables particularly low-emission operation to be implemented, since excess, unconsumed ammonia can be collected and retained by means of the ammonia slip catalyst. Excess, unconsumed ammonia is ammonia that has been formed from the reducing agent but has not participated in the SCR, or has not reacted in the course of the SCR to form water and nitrogen.

Finally, it has proved particularly advantageous if at least the combustor, the particulate filter and the SCR catalytic converter and preferably also the oxidation catalytic converter and/or the ammonia slip catalytic converter are arranged in a common box through which the exhaust gas from the internal combustion engine can flow and which is also referred to as an exhaust gas box. As a result, particularly advantageous temperatures of at least the particulate filter and the SCR catalytic converter can be implemented, such that particularly low-emission operation can be represented.

A second aspect of the invention relates to a drive device for a motor vehicle, in particular for an automobile. The drive device comprises the aforementioned internal combustion engine, by means of which the motor vehicle can be driven. Furthermore, the drive device comprises the exhaust system according to the first aspect of the invention. Advantages and advantageous embodiments of the first aspect of the invention are to be regarded as advantages and advantageous embodiments of the second aspect of the invention, and vice versa.

A third aspect of the invention relates to a motor vehicle, preferably in the form of a motor vehicle, which comprises at least one exhaust system according to the first aspect of the invention and/or a drive device according to the second aspect of the invention. Advantages and advantageous embodiments of the first and second aspects of the invention are to be regarded as advantages and advantageous embodiments of the third aspect of the invention, and vice versa.

Further advantages, features and details of the invention emerge from the following description of a preferred exemplary embodiment and from the drawings. The features and combinations of features mentioned above in the description, as well as the features and combinations of features mentioned below in the description of figures and/or shown alone in the figures, can be used not only in the combination indicated in each case, but also in other combinations or on their own, without departing from the scope of the invention.

DETAILED DESCRIPTION OF THE DRAWINGS

Figure 1:
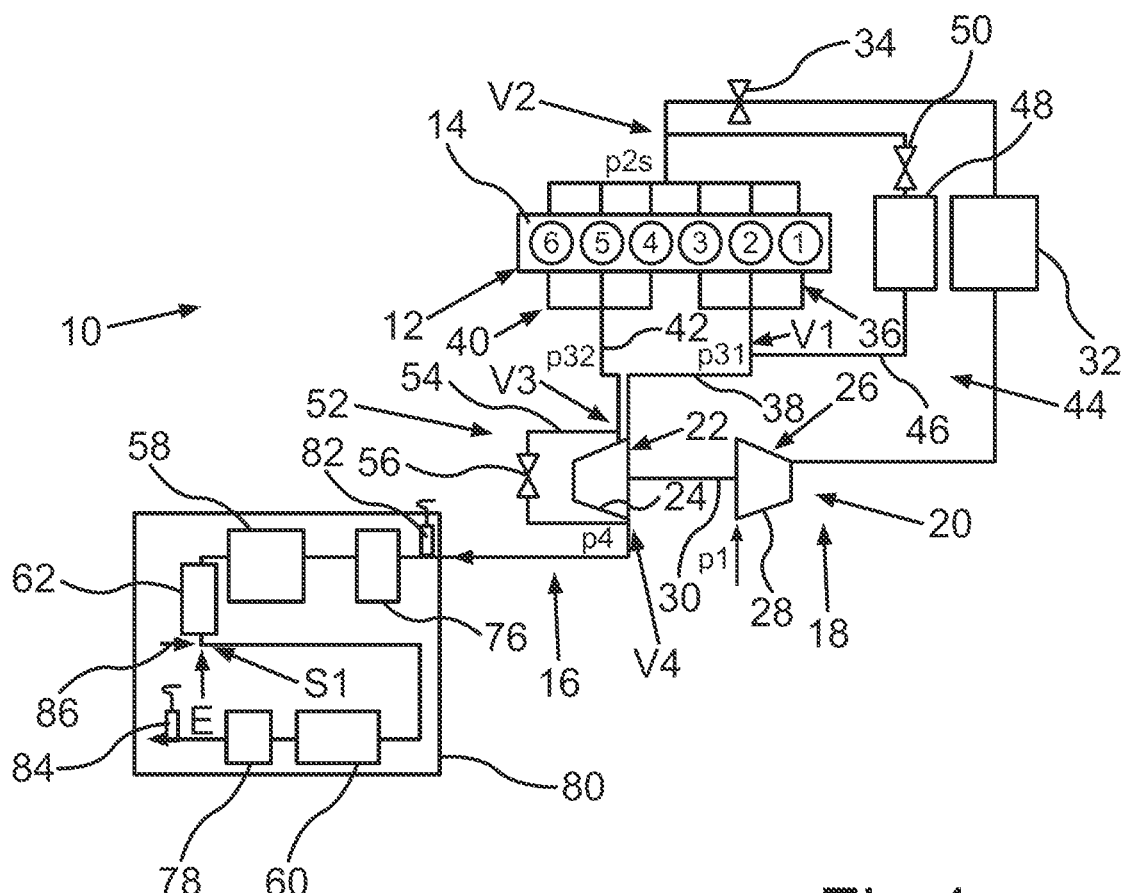
FIG. 1 is a schematic representation of a drive device according to the invention having an exhaust system according to the invention.

In the figures, identical or functionally identical elements are provided with identical reference numerals.

FIG. 1 shows a schematic representation of a drive device 10 of a motor vehicle, in particular an automobile. This means that the motor vehicle has, in its fully manufactured state, the drive device 10. The drive device 10 has an internal combustion engine 12, also referred to as an engine or internal combustion engine and designed, for example, as a reciprocating engine, by means of which the motor vehicle can be driven by an internal combustion engine. The internal combustion engine 12 has an engine housing 14 which is designed, for example, as a crankcase, in particular as a cylinder crankcase, and by means of which a plurality of cylinders 1, 2, 3, 4, 5, 6 of the internal combustion engine 12 are formed or delimited. During a fired operation of the internal combustion engine 12, combustion processes take place in the cylinders 1 to 6, which results in an exhaust gas, also referred to as an engine exhaust gas, of the internal combustion engine 12.

The drive device 10 has an exhaust tract through which the engine exhaust gas can flow, which is also referred to as the exhaust system 16. By means of the exhaust system 16, through which the engine exhaust gas can flow, the engine exhaust gas is discharged from the cylinders 1 to 6. The internal combustion engine 12 is further associated with an intake tract 18, also referred to as an inlet tract. The intake tract 18 can be passed through at least by fresh air, which is also referred to as combustion air and is supplied to the cylinders 1 to 6. As a result, cylinders 1 to 6 are supplied with the fresh air. In addition, the cylinders 1 to 6 are supplied with a preferably liquid fuel, whereby a combustion mixture comprising the fuel and the fresh air is formed in the respective cylinder 1 to 6. The combustion mixture is preferably ignited by self-ignition and thereby combusted, resulting in the engine exhaust gas. This means that the internal combustion engine 12 is designed in particular as a self-igniting internal combustion engine, in particular as a diesel engine. It is also conceivable that the combustion mixture is ignited by spark ignition and thereby combusted, resulting in the engine exhaust gas. This means that in the case of spark ignition, the internal combustion engine 12 is designed as a spark-ignited combustion engine, in particular as a petrol engine. In the exemplary embodiment shown in FIG. 1, the internal combustion engine 12 is preferably designed as a diesel engine.

The drive device 10 has at least or exactly one exhaust gas turbocharger 20, which comprises a turbine 22 arranged in the exhaust system 16 and having a turbine wheel 24. The turbine wheel 24 can be driven by the engine exhaust gas. The exhaust gas turbocharger 20 further comprises a compressor 26 arranged in the intake tract 18 and having a compressor wheel 28. The compressor wheel 28 and the turbine wheel 24 are non-rotatably connected to a shaft 30 of the exhaust gas turbocharger 20, such that the compressor wheel 28 can be driven by the turbine wheel 24 via the shaft 30. By driving the compressor wheel 28, the fresh air flowing through the intake tract 18 is compressed by means of the compressor wheel 28. Upstream of the compressor wheel 28, the fresh air has a first pressure $p1$. The compression of the fresh air heats the fresh air. In order to nevertheless achieve particularly high degrees of charging, an intercooler 32 is arranged in the intake tract 18 downstream of the compressor 26 and upstream of the cylinders 1 to 6. The compressed fresh air is cooled by means of the intercooler 32, in particular in such a way that the compressed fresh air downstream of the intercooler 32 has a second pressure $p2s$ and flows into the cylinders 1 to 6 at the second pressure $p2s$. A throttle valve 34 is arranged in the intake tract 18, in particular downstream of the intercooler 32. By means of the throttle valve 24, a quantity of fresh air, in particular compressed fresh air, to be supplied to the cylinders 1 to 6 can be set.

The exhaust gas from cylinders 1 to 3 is combined through a first exhaust manifold 36 or in a first exhaust manifold 36 to form a first flow 38 of the exhaust system 15. Accordingly, the engine exhaust gas from the cylinders 4 to 6 is combined through a second exhaust manifold 40 or in a second exhaust manifold 40 to form a second flow 42 of the exhaust system 16. In the flow 38, for example, the exhaust gas upstream of the turbine 22 has a third pressure $p31$, and in the flood 42 the exhaust gas upstream of the turbine 22 has a pressure $p32$. The exhaust is expanded by means of the turbine 22, in particular by means of the turbine wheel 24, such that the exhaust gas downstream of the turbine wheel 24 has a fourth pressure $p4$ that is lower than the pressure $p31$ or $p32$.

The drive device 10 has an exhaust gas recirculation device 44, also referred to as an exhaust gas recirculation system. The exhaust gas recirculation device 44 has a recirculation line 46, which is fluidically connected to the exhaust system 16 at a first connection point V1 and is fluidically connected to the intake tract 18 at a second connection point V2. In particular, the recirculation line 46 is fluidically connected to the flow 38 at the connection point V1, wherein preferably the recirculation line 46 is fluidically connected exclusively to the flow 38 with respect to the flows 38 and 42. The connection point V1 is arranged downstream of the cylinders 1 to 6 and upstream of the turbine wheel 24. The connection point V2 is arranged upstream of the cylinders 1 to 6 and downstream of the intercooler 32, in particular the throttle valve 34. By means of the recirculation line 46, at least part of the exhaust gas flowing through the flow 38 can be branched off from the flow 3 at the connection point v 1. The exhaust gas branched off from the flow 38 is introduced into the recirculation line 46 or flows into the recirculation line 46 and flows through the recirculation line 46. The exhaust gas flowing through the recirculation line 46 is guided by means of the recirculation line 46 to the connection point V2 and thus to the intake tract 18, and can flow out of the recirculation line 46 at the connection point V2 and flow into the intake tract 18. Thus, the exhaust gas can flow or be introduced from the recirculation line 46 into the fresh air flowing through the intake tract 18. The exhaust gas recirculation device 44 comprises an exhaust gas recirculation cooler 48 arranged in the recirculation line 46, by means of which the exhaust gas flowing through recirculation line 46 and being or to be recirculated is cooled. In addition, the exhaust gas recirculation device 44 comprises a valve element 50 arranged in the recirculation line 46, which is arranged, for example, downstream of the exhaust gas recirculation cooler 48. By means of the valve element 50, a quantity of the exhaust gas flowing through the recirculation line 46 and to be branched off from the flow 38 can be set or adjusted.

The turbine 22, in particular the turbine wheel 24, is assigned a bypass device 52. The bypass device 52 comprises a bypass line 54, also referred to as a wastegate. The bypass line 54 is fluidically connected to the exhaust system 16 at a third connection point V3 and a fourth connection point V4. The connection point V3 is arranged downstream of the cylinders 1 to 6, in particular downstream of the connection point V1, and upstream of the turbine wheel 24. In particular, the bypass line 54 is fluidically connected to the flow 42 at the connection point V3. By way of example, with respect to the flows 38 and 42, the bypass line 54 is exclusively fluidically connected to the flow 42. The connection point V4 is arranged downstream of the turbine wheel 24. By means of the bypass line 54, at least part of the exhaust gas flowing through the exhaust system 16, in particular the flow 42, can be branched off from the exhaust system 16, in particular from the flow 42, and introduced around the bypass line 54. The exhaust gas introduced into the bypass line 54 flows through the bypass line 54 and is guided to the connection point V4 by means of the bypass line 54. At the connection point V4, the exhaust gas flowing through the bypass line 54 can flow out of the bypass line 54 and flow into the exhaust system 16. The exhaust gas flowing through the bypass line 54 bypasses the turbine wheel 24 such that the turbine wheel 24 is not driven by the exhaust gas flowing through the bypass line 54.

The bypass line 54 and a valve element 56 arranged in the bypass line 54, by means of which a quantity of the exhaust gas flowing through the bypass line 54 and thus bypassing the turbine wheel 24 can be set or adjusted. The second pressure $p2s$ is also referred to as the boost pressure, at which, for example, the fresh air is compressed by means of the compressor 26. By way of example, the boost pressure can be set, in particular regulated, by adjusting the quantity of exhaust gas flowing through the bypass line 54 and thus bypassing the turbine wheel 24.

The exhaust system 16 has a particulate filter 58 through which the engine exhaust gas can flow and which is arranged downstream of the turbine 22 and which can be designed as a diesel particulate filter (DPF) or catalytically coated diesel particulate filter (CDPF), by means of which particles contained in the engine exhaust gas, in particular soot particles, can be or are filtered out of the engine exhaust gas. In addition, the exhaust system 16 has an SCR catalytic converter 60 through which the engine exhaust gas can flow and which is arranged downstream of the particulate filter 58 and by means of which the engine exhaust gas or the exhaust gas flowing through the particulate filter 58 can be denitrified.

In order to implement a particularly low-emission operation, the exhaust system has, in particular at least or exactly, one combustor 62 which is arranged downstream of the particulate filter 58 and upstream of the SCR catalytic converter 60 in the direction of flow of the engine exhaust gas flowing through the exhaust system 16. This means that the engine exhaust gas (exhaust gas of the internal combustion engine) can be heated or is heated by means of the combustor 62 at, in particular at least or exactly, a point S1 arranged upstream of the SCR catalytic converter 60 and downstream of the particulate filter 58, while providing an exhaust gas of the combustor 62 also referred to as combustor exhaust gas.

Figure 4:
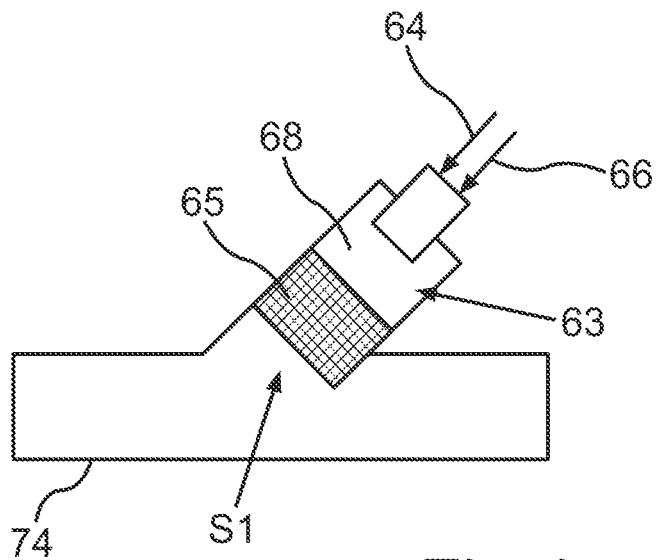
FIG. 4, in sections, is a further schematic representation of the exhaust system.

In conjunction with FIG. 4, it can be seen that the exhaust system 15 furthermore has a filter element 65 which is provided in addition to the particulate filter 58 and, in particular, is spaced apart from the particulate filter 58 and by means of which particles contained in the combustor exhaust gas can be filtered out of the combustor exhaust gas (exhaust gas of the combustor 62). In this way, the engine exhaust gas downstream of the particulate filter 58 and thus of the SCR catalytic converter 60 can be effectively and efficiently heated, while, for example, excessive heating of the particulate filter 58 caused by means of the combustor 62 can be avoided, and at the same time excessive particle emissions can be avoided. As a consequence, a particularly low-emission operation can be represented, in particular with regard to particle and oxide emissions.

Figure 2:
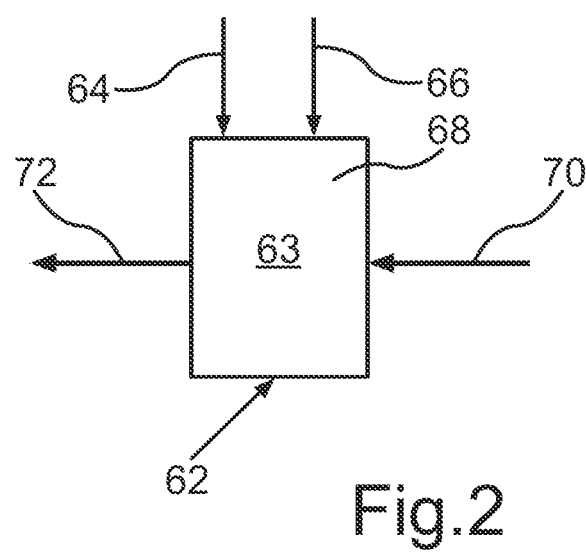
FIG. 2 is a schematic representation of a combustor of the exhaust system.

FIG. 2 shows the combustor 62 in a particularly schematic representation. In FIG. 2, an arrow 64 illustrates a fuel supply via which the combustor 62, in particular a combustion chamber 63 of the combustor 62 arranged in the combustor 62, can be or is supplied with a fuel, in particular liquid or gaseous fuel. In FIG. 2, an air supply is illustrated by an arrow 66, via which the combustor 62, in particular the combustion chamber 63, can be supplied with air also referred to as combustor air. A fuel-air mixture comprising the fuel and the combustion air can be formed in the combustion chamber 63. The fuel-air mixture, simply also referred to as the mixture, is ignited in the combustion chamber 63, for example by means of a spark ignition device 68, and subsequently combusted, resulting in the combustor exhaust gas. The spark ignition device 68 is, for example, a spark plug and/or glow plug.

In FIG. 2, an exhaust gas inlet, in particular of the combustor 62, is illustrated by an arrow 70. Also illustrated in FIG. 2 by an arrow 72 is an exhaust gas outlet, in particular of the combustor 62. By way of example, the engine exhaust gas can flow into the combustor 62, in particular the combustion chamber 63, via the exhaust gas inlet (arrow 70). Thus, for example, the engine exhaust gas that has flowed into the combustion chamber 63 through the exhaust gas inlet can mix with the combustor exhaust gas. As a result, the engine exhaust gas and the combustor exhaust gas mixed therewith form a total exhaust gas, which can flow out of the combustion chamber 63 or out of the combustor 62, for example, via the exhaust gas outlet. The total exhaust gas has a temperature higher than the engine exhaust gas alone, such that the temperature of the engine exhaust gas can be increased by means of the combustor 62 while combusting the mixture and thus while providing the combustor exhaust gas.

It can be seen from FIG. 4 that the exhaust system 16 has a pipe element 74 through which the engine exhaust gas can flow. Here, the combustion chamber 63 is preferably arranged outside the pipe element 74. In the combustion chamber 63, the fuel-air mixture is to be ignited and combusted to form the combustor exhaust gas. In doing so, for example, the combustion chamber 63 is fluidically connected to the pipe element 74 at the point S1. Thus, at the point S1, the combustor exhaust gas can be introduced from the combustion chamber 63 into the pipe element 74 and thus into the engine exhaust gas flowing through the pipe element 74 such that, for example, the combustor exhaust gas mixes with the engine exhaust gas in the pipe element 74. The filter element 65 is preferably arranged downstream of the combustion chamber 63 and upstream of the point S1, also referred to as the introduction point, and through which the combustor exhaust gas from the combustion chamber 63 can flow. This enables the filter element 65 to filter out particles contained in the combustor exhaust gas, in particular before the combustor exhaust gas flows into the engine exhaust gas or into the pipe element 74. In this way, the particle emissions can be kept particularly low.

Figure 3:
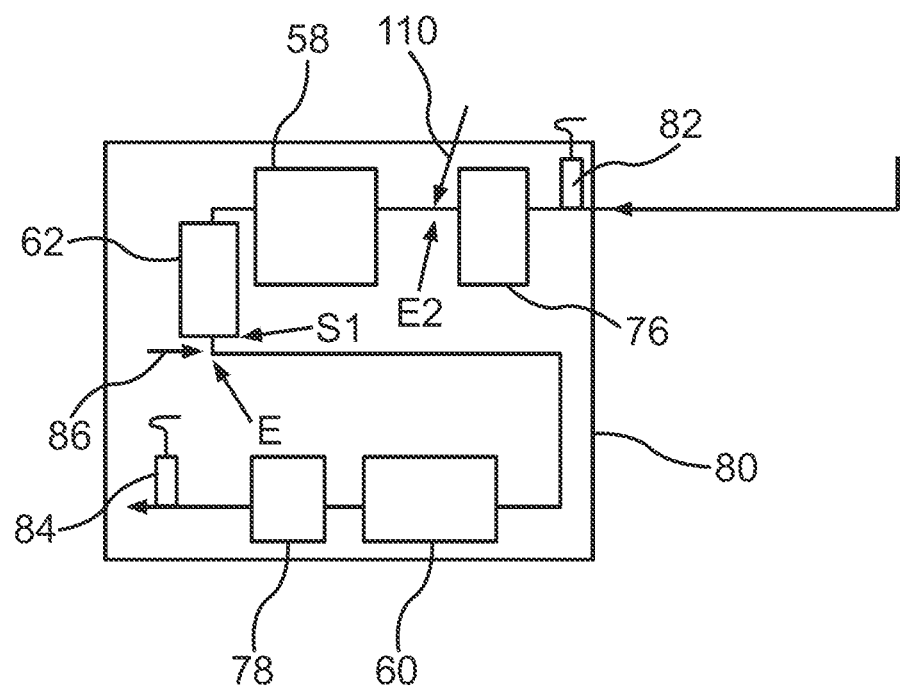
FIG. 3, in sections, is a schematic representation of the exhaust system.

It can be seen from FIG. 1 that the exhaust system 16 downstream of the SCR catalytic converter 60 is free of a further filter for filtering the respective exhaust gas. It can be seen from FIGS. 1 and 3 that the exhaust system 16 has an exhaust gas aftertreatment component 76, which is arranged upstream of the particulate filter 58 and downstream of the turbine wheel 24 in the flow direction of the exhaust gas flowing through the exhaust system 16. Preferably, the exhaust gas aftertreatment component 76 is designed as an oxidation catalyst, in particular as a diesel oxidation catalyst (DOC), or else as a nitrogen oxide storage catalyst (NSK). In other words, it is preferably provided that the exhaust gas aftertreatment component 76 has an oxidation catalyst, in particular a diesel oxidation catalyst and/or a nitrogen oxide storage catalyst.

The exhaust system 16 further has an ammonia slip catalyst (ASC) 78 arranged downstream of the SCR catalytic converter 60. Furthermore, it can be seen from FIGS. 1 and 3 that, for example, the combustor 62, the particulate filter 58, the SCR catalytic converter 60, and also the exhaust gas aftertreatment component 76 and the ammonia slip catalyst 78 are arranged in a common box 80. By way of example, the exhaust gas is deflected at least twice, in particular at least three times and preferably at least or exactly four times by at least or exactly 90 degrees on its path from the particulate filter 58 to the SCR catalytic converter 60. In this way, particularly advantageous temperatures of the SCR catalytic converter 60 in particular can be achieved.

It has further been shown to be particularly advantageous if the particulate filter 58, in particular its filter structure for filtering out the particles from the engine exhaust gas, has a catalytically active coating or is provided with a catalytically active coating. The catalytically active coating is catalytically active in particular for selective catalytic reduction and can thus catalytically support or effect SCR.

The fuel supply is also referred to as the fuel supply line, wherein the combustor air supply is also referred to as the air supply line. In addition, the spark ignition device 68 is also referred to as the ignition source. The relatively cold exhaust gas from the internal combustion engine 12 can be heated by the combustor 62 and discharged from the combustor 62, in particular from the combustion chamber 63, for example with a temperature difference. The output of the combustor 62 depends on the fuel supply and the amount of combustor air required to combust the fuel. The fuel-air mixture is ignited, for example, at the spark ignition device 68 formed as a spark plug or glow plug, or is ignited by spark ignition device 68 formed as a spark plug or glow plug. The combustor 62 is operated, in particular controlled or regulated, for example. Different temperature sensors and/or sensors for a lambda control can be used for the regulation of the combustor 62.

The exhaust system 16 has at least one first sensor 82 and at least one second sensor 84. The sensor 82 is, for example, a temperature sensor by means of which a temperature of the engine exhaust gas can be detected upstream of the exhaust gas aftertreatment component 76 and downstream of the turbine wheel 24. Alternatively or additionally, the sensor 82 is a lambda probe, by means of which an oxygen concentration of the engine exhaust gas or an oxygen content in the engine exhaust gas can be detected. By way of example, the sensor 84 is a temperature sensor by means of which a temperature of the exhaust gas downstream of the ammonia slip catalyst 78 can be detected. Alternatively or additionally, the sensor 84 is a lambda probe by means of which residual oxygen in the exhaust gas or a residual oxygen content in the exhaust gas can be detected. In particular, the combustor 62 can be operated, in particular controlled, depending on the temperatures and/or residual oxygen contents detected by means of the sensors 82 and 84.

The fuel is introduced, in particular injected, into the combustion chamber 63 by means of a nozzle, for example. By way of example, the combustor 62 is operated stoichiometrically, such that the fuel-air mixture comprising the fuel and the combustor air is stoichiometric. Again expressed in other words, for example, the combustor air and the fuel are stoichiometrically mixed and ignited by the ignition source. In classic, conventional arrangements of combustors, the oxidation catalyst and particulate filter are typically heated first, before the SCR catalytic converter is heated. The sheet metal and the catalytic converters have a considerable heat capacity, such that the temperature increase of the SCR catalytic converter is greatly delayed. In contrast, a much faster temperature increase of the SCR catalytic converter 60 can be implemented such that the combustor 62 is arranged downstream of the particulate filter 58 and upstream of the SCR catalytic converter 60 and thereby, for example, immediately downstream of the particulate filter 58.

The exhaust system 16 also has a metering element 86, by means of which the reducing agent can be introduced into the exhaust gas flowing through the exhaust system 16 at an introduction point E. The introduction point E is arranged downstream of the point S1 or downstream of the combustor 62 and upstream of the SCR catalytic converter 60. Thus, the combustor 62 is preferably arranged upstream of the metering element 86 or upstream of the introduction point E. Again expressed in other words, the metering element 86 or the introduction point E is placed downstream of the combustor 62, or the combustor 62 is placed upstream of the metering element 86 or of the introduction point E. The combustor exhaust gas may contain particles, which are filtered out or collected from the combustor exhaust gas by means of the separate, small filter element 65. The particles of the combustor 62 produced by the combustion of the fuel-air mixture are collected in the separate small filter element 65 downstream of the combustor 62. The filter element 65 acting as a filter can be relatively small, since the exhaust gas flow and particle flow are very small in relation to the engine mass flow and since the number of particles from the combustor 62 is also very small in relation to ash and oil and engine abrasion from the internal combustion engine 12.

Figure 5:
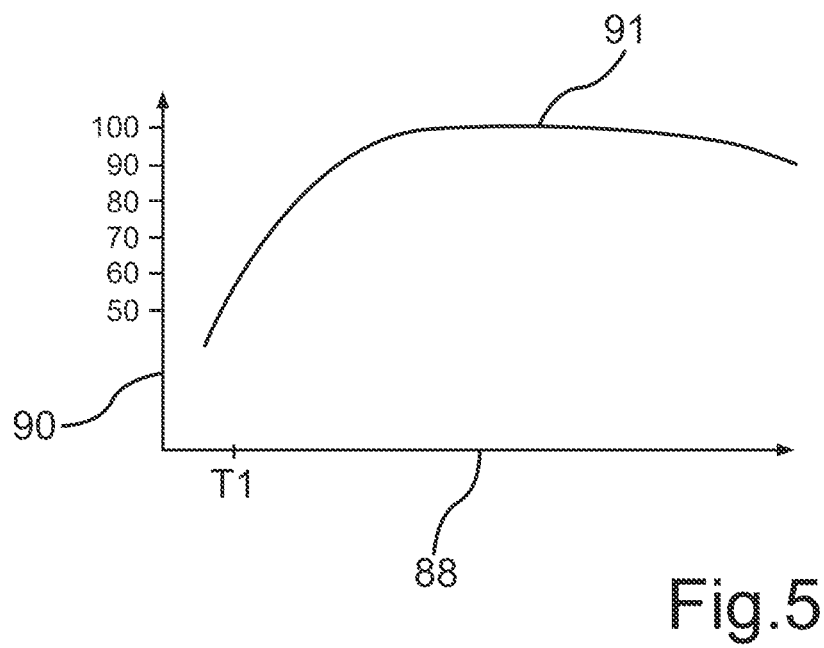
FIG. 5 is a diagram illustrating an operation of the exhaust system.

From FIG. 4, it can be seen that the filter element 65 may be arranged some distance directly downstream of the combustion chamber 63. The particles contained in the combustor exhaust gas, which are for example soot, can be collected in the filter element 65. Due to the high temperature of the combustor exhaust gas or the combustor 62 itself, a soot burn-off can be represented or ensured at any time with a low oxygen content, by means of which the particles retained and collected by means of the filter element 65 and thus located in the filter element 65 can be burned off, i.e., removed from the filter element 65. FIG. 5 shows a diagram on whose abscissa 88 the temperature of the exhaust gas is plotted. On the ordinate 90, the efficiency or effectiveness with which nitrogen oxides contained in the exhaust gas can be reduced by SCR is plotted. In FIG. 5, T1 denotes a temperature of the exhaust gas, wherein the reducing agent is introduced into the exhaust gas by means of the metering element 86, for example, only when the exhaust gas has a temperature that is greater than or equal to the temperature T1. The temperature T1 is, for example, approximately 180 degrees Celsius and is thus a metering release for the introduction of the reducing agent into the exhaust gas. A course 91 thus illustrates the efficiency versus temperature of the exhaust gas.

With SCR copper catalysts, sulphur poisoning and a reduction in the conversion rate can occur due to sulphur-containing oil and fuel. Desulphurisation, also referred to as desulphurising, requires a high temperature. This is achieved in conventional exhaust systems by high temperature regeneration. With a combustor upstream of an SCR catalytic converter, desulphurisation can occur independently of the filter regeneration, in particular if the combustor is located downstream of the particulate filter. This is the case with the exhaust system 16. In particular, it is provided in the exhaust system 16 that downstream of the SCR catalytic converter 60, filtration of the exhaust gas with respect to filtering out particulates from the exhaust gas no longer takes place. Furthermore, the arrangement of the combustor 62 upstream of the SCR catalytic converter 60 and downstream of the particulate filter 58 has the advantage that the exhaust gas counterpressure can be kept particularly low, which means that requirements for a secondary air blower for the combustor 62 can be kept low. By means of the secondary air blower, for example, the combustor air is conveyed, and in particular conveyed towards the combustor 62 and, in particular, conveyed into the combustion chamber 63. This is turn has the advantage that particularly simple and inexpensive blowers can be used as secondary air blowers.

The SCR temperature is strongly reduced and delayed by the thermal mass of the upstream oxidation catalyst and particulate filter 58. This can make accurate temperature control difficult. However, since the combustor 62 is now arranged as a heat source directly upstream of the SCR catalytic converter 60 and downstream of the particulate filter 58, a particularly simple and exact or precise temperature control, in particular of the SCR catalytic converter 60, can be implemented, whereby an activation or operation of the combustor 62 and an associated power or fuel consumption can be kept particularly low. As can be seen from FIG. 3, it is possible that the exhaust system 16 has a second metering element 110. By means of the metering element 110, the reducing agent can be introduced, in particular injected, into the exhaust gas, in particular at least into the engine exhaust gas, at a second introduction point E2, which is in particular spaced apart from the introduction point E. The second introduction point E2 is arranged upstream of the particulate filter 58 and preferably downstream of the exhaust gas aftertreatment component 76.

Figure 6:
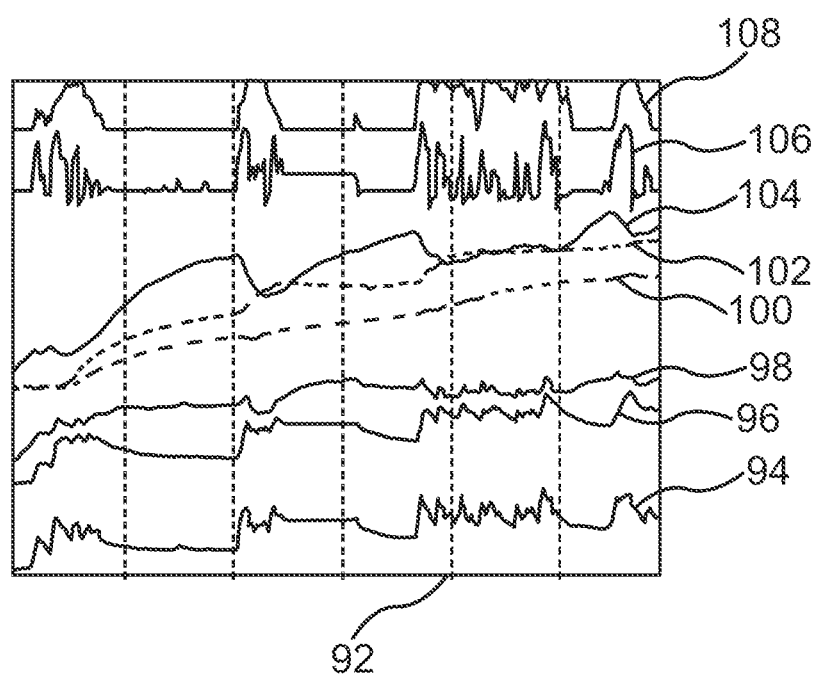
FIG. 6 is a further diagram for further illustrating operation of the exhaust system.

Finally, FIG. 6 shows a graph with time plotted on the abscissa 92. A course 94 illustrates a temperature of the internal combustion engine 12. A course 96 illustrates a temperature of the exhaust gas aftertreatment component 76 of the exhaust system 16. A course 98 illustrates the temperature of the exhaust gas aftertreatment component 76 if the combustor 62 were arranged upstream of the oxidation catalyst or upstream of the exhaust gas aftertreatment component 76. A course 100 illustrates a temperature of the SCR catalytic converter 60 while there is no operation of the combustor 62. A course 102 illustrates a temperature of the SCR catalytic converter 60 if the combustor 62 were arranged upstream of the oxidation catalyst or upstream of the exhaust gas aftertreatment component 76. In addition, a course 104 illustrates the temperature of the SCR catalytic converter 60 at the exhaust system 16, i.e., when the combustor 62 is arranged downstream of the particulate filter 58 and upstream of the SCR catalytic converter 60. A course 106 illustrates the load of the internal combustion engine 12, and a course 108 illustrates the speed of the internal combustion engine 12.

LIST OF REFERENCE CHARACTERS 1 cylinder
2 cylinder
3 cylinder
4 cylinder
5 cylinder
6 cylinder
10 drive device
12 internal combustion engine
14 engine housing
16 exhaust system
18 intake tract
20 exhaust gas turbocharger
22 turbine
24 turbine wheel
26 compressor
28 compressor wheel
30 shaft
32 intercooler
34 throttle valve
36 exhaust manifold
38 flow
40 exhaust manifold
42 flow
44 exhaust gas recirculation device
46 recirculation line
48 recirculation cooler
50 valve element
52 bypass device
54 bypass line
56 valve element
58 particulate filter
60 SCR catalytic converter
62 combustor
63 combustion chamber
64 arrow
65 filter element
66 arrow
68 spark ignition device
70 arrow
72 arrow
74 exhaust pipe
76 exhaust gas aftertreatment component
78 ammonia slip catalyst
80 box
82 sensor
84 sensor
86 metering element
88 abscissa
90 ordinate
91 course
92 abscissa
94 course
96 course
98 course
100 course
102 course
104 course
106 course
108 course
110 metering element
E introduction point
E2 introduction point
p1 pressure
p2s pressure
p31 pressure
p32 pressure
p4 pressure
S1 point
T1 temperature
V1 connection point
V2 connection point
V3 connection point
V4 connection point

The invention claimed is:

1. An exhaust system (16) of an internal combustion engine (12) of a motor vehicle, comprising:
a particulate filter (58) through which exhaust gas from the internal combustion engine (12) is flowable, wherein particles are filterable out from the exhaust gas by the particulate filter (58);
a selective catalytic reduction (SCR) catalytic converter (60) through which the exhaust gas from the internal combustion engine (12) is flowable for denitrifying the exhaust gas from the internal combustion engine (12), wherein the SCR catalytic converter is disposed downstream of the particulate filter (58) in a direction of flow of the exhaust gas from the internal combustion engine (12) flowing through the exhaust system (16);
a combustor (62), wherein the combustor (62) is disposed downstream of the particulate filter (58) and upstream of the SCR catalytic converter (60) in the direction of flow such that the exhaust gas of the internal combustion engine (12) is heatable by the combustor (62) at a point (S1) disposed upstream of the SCR catalytic converter (60) and downstream of the particulate filter (58) in the direction of flow and wherein the combustor (62) provides an exhaust gas of the combustor (62); and
a filter element (65), wherein particles are filterable out from the exhaust gas of the combustor (62) by the filter element (65).

2. The exhaust system (16) according to claim 1, further comprising a pipe element (74) through which the exhaust gas from the internal combustion engine (12) is flowable, wherein the combustor (62) has a combustion chamber (63) disposed outside the pipe element (74) and wherein in the combustion chamber (63) a fuel-air mixture is ignitable and is combustible when forming the exhaust gas of the combustor (62), wherein at the point (S1) the exhaust gas of combustor (62) is introducible from the combustion chamber (63) into the pipe element (74), and wherein the filter element (65) is disposed downstream of the combustion chamber (63) and upstream of the point (S1) and through which the exhaust gas of the combustor (62) is flowable.

3. The exhaust system (16) according to claim 1, wherein the exhaust system (16) downstream of the SCR catalytic converter (60) is free of a further filter.

4. The exhaust system (16) according to claim 1, further comprising an oxidation catalyst (76) through which the exhaust gas from the internal combustion engine (12) is flowable and/or a nitrogen oxide storage catalyst (76) through which the exhaust gas from the internal combustion engine (12) is flowable disposed upstream of the particulate filter (58).

5. The exhaust system (16) according to claim 1, further comprising a metering element (86), wherein via the metering element (86) a reducing agent for denitrifying the exhaust gas of the internal combustion engine (12) is introducible into the exhaust gas of the internal combustion engine (12) at an introduction point (E) disposed downstream of the point (S1) and upstream of the SCR catalytic converter (60).

6. The exhaust system (16) according to claim 1, wherein the particulate filter (58) has a coating that is catalytically effective for selective catalytic reduction for denitrifying the exhaust gas.

7. The exhaust system (16) according to claim 1, further comprising an ammonia slip catalyst (78) disposed downstream of the SCR catalytic converter (60) and through which the exhaust gas from the internal combustion engine (12) is flowable.

8. The exhaust system (16) according to claim 1, wherein at least the combustor (62), the particulate filter (58), and the SCR catalytic converter (60) are disposed in a common box (80) through which the exhaust gas from the internal combustion engine (12) is flowable.

9. A drive device (10) for a motor vehicle, comprising:
   an internal combustion engine (12) for driving the motor vehicle; and
   the exhaust system (16) according to claim 1.

10. A motor vehicle, comprising:
    the exhaust system (16) according to claim 1.

* * * * *